United States Patent [19]

Monick et al.

[11] Patent Number: 4,457,407
[45] Date of Patent: Jul. 3, 1984

[54] AUTOMATIC SLACK ADJUSTER

[75] Inventors: Frederick R. Monick, Kalamazoo; Stanley J. Muster, Marshall, both of Mich.

[73] Assignee: Eaton Corporation, Cleveland, Ohio

[21] Appl. No.: 357,243

[22] Filed: Mar. 11, 1982

[51] Int. Cl.³ .......................................... F16D 65/56
[52] U.S. Cl. ............................ 188/71.9; 188/196 BA
[58] Field of Search .............. 188/71.9, 196 R, 196 D, 188/196 F, 196 BA; 267/170, 179

[56] References Cited

U.S. PATENT DOCUMENTS 1,924,604  8/1933  Gray ............................ 267/170 X
3,966,028  6/1976  Anderson et al. ............ 188/196 BA Primary Examiner—Duane A. Reger
Attorney, Agent, or Firm—C. H. Grace; H. D. Gordon

[57] ABSTRACT

An improved automatic slack adjuster (10) for disc brakes is provided. The slack adjuster includes an elongated rod (16) threadably attached to a nut member (28), only one of which rod and nut member is rotatable relative to the housing (12) for slack adjustment purposes. A coil return spring (36) acts on spring seat washer (40) which bears on the nut member. The spring seat washer is rotationally fixed (42, 44) to the non-rotatable one of the rod and nut members to prevent windup of the coil return spring during a slack adjustment operation.

2 Claims, 3 Drawing Figures

AUTOMATIC SLACK ADJUSTER

BACKGROUND OF THE INVENTION

1. Field of the Invention

The present invention relates to automatic slack adjusters, preferably of the single acting clearance or force sense sensing type, for disc brakes and in particular relates to improved single acting automatic slack adjusters for disc brakes wherein means are provided to prevent the coil return springs from being torsioned (i.e. wound up) during the adjustment operation which might result in an undesirable rotation of the adjusting mechanism as the return spring later unwinds.

2. Brief Description of the Prior Art

Automatic slack adjusters for railway brakes and automative brakes of both the disc and drum type are well known. In particular, automatic, single acting (i.e. operates automatically in the slack take-up direction only) vehicle slack adjusters of the force sensing type (also called the clearance sensing type) wherein the adjustment mechanism will sense the forces in the brake system and either disengage the adjustment mechanism or slip when forces exceed a predetermined level, usually corresponding to the expected forces in the system when the drums or discs are contacted by the movable friction elements, to prevent over adjustment are well known and may be appreciated in greater detail by reference to U.S. Pat. Nos. RE 26,965 and 3,507,369, both of which are hereby incorporated by reference. Clearance sensing slack adjusters wherein a torque limited friction clutch of the coil slip clutch type is utilized to limit torque applied to an adjustment member are also known as may be seen by reference to U.S. Pat. Nos. 3,507,369 and 3,901,357, both of which are hereby incorporated by reference.

Automatic slack adjusters for disc brakes wherein a rod carrying a friction pad, or a slidable caliper pressure plate, is threadably attached to an adjustment nut member, and slack is maintained within predetermined limits by selective relative rotation of the adjustment nut member and rod are known in the prior art as may be seen by reference to U.S. Pat. Nos. 3,966,028 and 4,064,973, both hereby incorporated by reference.

While the automatic clearance sensing disc brake slack adjusters of the prior art have been generally well received, certain of the prior art devices were not totally satisfactory as rotation of the rotatable adjustment member tended to torque (i.e. wind-up) the brake coil return spring, which return spring tended to unwind in a manner causing the rotatable adjustment member to be undesirably rotated in the slack increasing direction of rotation.

SUMMARY OF THE INVENTION

In accordance with the present invention, the drawbacks of the prior art have been overcome or minimized to the extent that an improved automatic disc brake slack adjuster of the type utilizing an adjustment mechanism comprising a relatively rotatable threadably engaged nut member and rod member and a coil compression return spring acting on the nut member is provided wherein the return spring is isolated from rotation of the rotatable adjustment member. The above is accomplished by providing spring seats, such as washers, which are rotationally fixed relative to the nonrotatable one of the relatively rotatable rod and nut members.

In the preferred embodiment, the rod is threadably attached to an adjustment nut member and is rotationally fixed relative to a housing whereby rotation of the adjustment nut member in a given direction of rotation relative to the housing will axially advance the rod, and the friction material or pressure plate fixed thereto, relative to the adjustment nut member. A coil compression return spring is provided to resiliently bias the brake actuating mechanism, including the nut and rod adjustment members, in the brake release axial direction. A washer is axially movably and nonrotationally carried by the rod and bears on the adjustment nut member for providing a seat for the return spring. Accordingly, rotation of the adjustment nut member will not be transferred to the coil return spring. Alternatively, the washer may be directly axially slidably but nonrotationally mounted to the housing.

It is an object of the present invention to provide a new and improved automatic slack adjuster for disc brakes.

This and other objects and advantages of the present invention will become apparent from the reading of the detailed description of the invention taken in connection with the drawings.

DESCRIPTION OF THE PREFERRED EMBODIMENT

Figure 1:
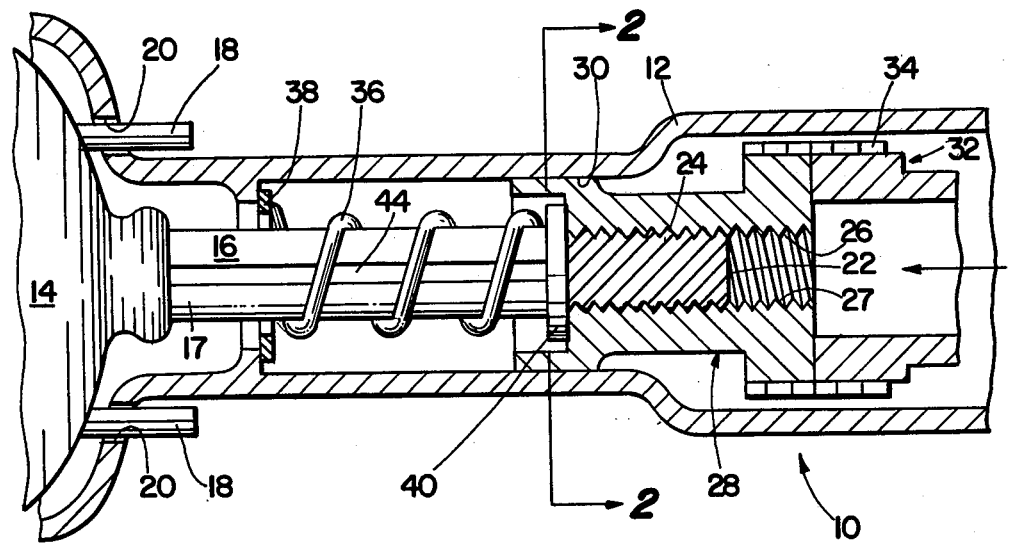
FIG. 1 is a partial sectional view of a portion of a typical wedge and/or roller actuated disc brake utilizing the improved slack adjuster of the present invention.

Certain terminology will be used in the following description for convenience in reference only and will not be limiting. The words "upwardly," "downwardly," "rightwardly" and "leftwardly" will designate directions in the drawings to which reference is made. The words "inboard" and "outboard" will designate directions toward and away from the centerline of a vehicle to which the disc brake is mounted, being rightwardly and leftwardly, respectively, in FIG. 1. The words "inwardly" and "outwardly" will refer to directions toward and away from, respectively, the geometric center of the device and designated parts thereof. Said terminology will include the words above specifically mentioned, derivatives thereof and words of similar import.

One embodiment of the improved automatic slack adjuster of the present invention is illustrated as utilized with a disc brake wedge-type actuator in FIG. 1. The disc brake actuator-adjuster assembly 10 comprises a housing 12 which is mountable to a caliper (not shown) such as a floating or sliding caliper or the like. The specific structure of the housing 12 and of the caliper forms no part of the present invention.

Figure 3:
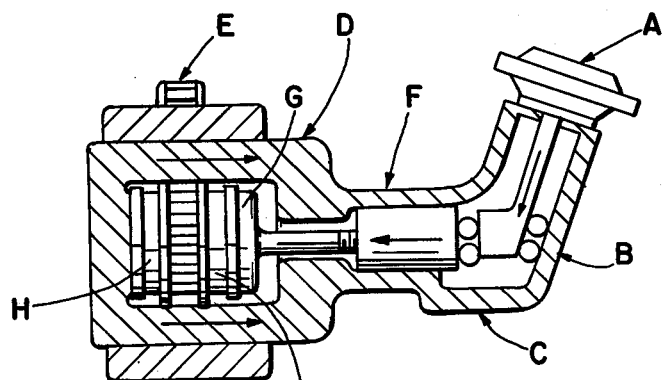
FIG. 3 is sectional schematic illustration of a sliding caliper disc brake in the applied position.

Sliding caliper disc brakes are schematically illustrated in FIG. 3 and typically include an air chamber, or air motor A, a wedge actuator assembly B, a housing C carrying a caliper D and a relatively rotatable disc E. An actuation/adjustment mechanism F is slidably received in the housing C for selectively advancing a caliper pressure plate G towards the disc to cause the friction shoes H to frictionally engage the disc and for maintaining a predetermined running clearance or slack, between the shoes and the disc.

A disc brake shoe, or a sliding caliper pressure plate 14 is nonrotationally carried by an elongated rod 16 on the outboard end 17 thereof for axial movement therewith. Leftward axial movement of rod 16 and pressure plate 14 will result in frictional engagement of a rotatable disc, as is well known. A pair of pins 18 are slidably received in bores 20 in housing 12 to prevent rotation of plate 14 and rod 16 relative to housing 12. Pins 18 may also serve as lining wear indicators or the like.

The inboard end 22 of rod 16 is provided with external threads 24 which are threadably engaged with internal threads 26 provided in bore 27 in adjustment nut member 28. Adjustment nut member 28 is axially and rotationally movable in bore 30 of housing 12. To apply the brake 10 by leftward axial movement relative to housing 12 of adjustment nut member 28, rod 16 and pressure plate 14, a well known air or fluid motor-wedge actuator assembly (not shown) such as are illustrated in U.S. Pat. Nos. 3,547,229; 4,064,973 and 4,085,830 all of which are hereby incorporated by reference, may be utilized. The actuator assembly will act through driving member 32 to apply a leftwardly directed axial force to nut member 28.

To adjust for wear of the brake friction material (not shown) to maintain the running clearance, or slack, between the disc and the friction material within predetermined limits, it is necessary to occasionally increase the axial spacing between pressure plate 14 and adjustment member 28 in a predetermined, controlled manner. This is accomplished by the use of stroke and/or stroke-force sensing automatic adjusting mechanisms which will selectively rotate adjustment member 28 relative to housing 12. In the illustrated adjuster, the adjusting mechanism includes a means (not shown) to sense greater than expected axial movement of driving member 32 during the brake applying operation and means to automatically rotate the driving member in response thereto. A torque limiting coil clutch 34 will rotate the adjustment nut 28 in response to rotation of driving member 32. As rod 16 is rotatably fixed to housing 12, rotation of nut member 28 in the slack decreasing direction of rotation relative to housing 12 will result in increased axial extension of outboard rod end and plate 14 relative to the nut member 28. The specific construction of the mechanism for selectively rotating adjustment member 28, usually in response to sensing greater than expected axial movement thereof, forms no part of the present invention. Mechanisms of this type may be seen by reference to U.S. Pat. Nos. 3,211,263; 3,547,229; 3,966,028; 4,064,973 and 4,085,830, all hereby incorporated by reference.

A coil compression return spring 36 surrounds rod 16 and is axially restrained between spring seat 38 axially fixed to housing 12 at the outboard end of bore 30 and washer 40 to urge the adjustment nut mechanism 28, rod 16 and pressure plate 14 rightwardly for release or disengagement of the brake. Washer 40 bears directly on the outboard surface of adjustment member 28.

Figure 2:
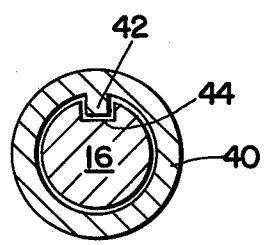
FIG. 2 is sectional view taken along line 2—2 in FIG. 1.

As may be seen by reference to FIG. 2, washer 40 is provided with an inwardly extending tab 42 which is slidably received in an axially extending groove 44 provided in rod 16. Accordingly washer 40 is axially movable relative to rod 16 and housing 12 but is substantially rotationally fixed relative to housing 12 and rod 16. By rotationally fixing washer 40 to rod 16, rotational movement of adjustment nut member 28 relative to rod 16 during a slack adjustment operation will not result in rotation in washer 40 nor of return spring 36 relative to housing 12 thereby eliminating the tendency of the return spring to wind up due to rotation of nut member 28 and then later unwind disadjusting the brake 10.

As is known, automatic slack adjusters may be provided wherein the adjustment nut member 28 is rotationally fixed relative to the housing and the rod 16 is selectively rotated relative to the housing for slack adjustment purposes. In such an adjuster, the spring seat bearing on the adjustment member would be rotationally fixed relative to the adjustment member.

Of course, various structures other than the illustrated tab 36 and groove 38 may be utilized to rotationally fix the spring seat to the non-rotatable one of the adjustment nut member and rod.

Alternatively, washer 40 may be slidably but nonrotationally mounted directly to housing 12 by means of a radially outwardly extending tab received in an axially extending groove provided in the housing, or the like.

Although this invention has been described in its preferred embodiment with a certain degree of particularity, it is understood that the present disclosure of the preferred form has been made only by way of example and that numerous changes in the details of construction and combination and arrangement of parts may be resorted to without departing from the spirit and the scope of this invention as hereinafter claimed.

We claim:

1. An improved disc brake clearance sensing slack adjuster for maintaining a predetermined running clearance between the brake friction pads and the disc, said adjuster comprising a housing, a disc rotatable relative to the housing, an elongated rod axially movable in the housing, a nut member axially movable in the housing, said rod member threadably engaged at one end thereof to said nut member, a friction pad engagement means fixed to the other end of said rod, actuating means to selectively axially move said nut member and rod towards said disc, automatic adjustment means to rotate said nut member relative to said housing in response to sensing greater than predetermined running clearance, means to rotationally fix said rod member relative to said housing and a coil compression return spring surrounding said rod member and acting on said nut member to resiliently urge said nut member away axially from said disc, the improvement comprising, said rod provided with an axially extending groove on the outer surface thereof and a washer spring seat seating one end of said compression spring and axially engageable with said nut member, said washer spring seat provided with a radially inwardly extended tab which is slidably receivable in said groove whereby said washer is axially movable and rotationally fixed relative to said housing and said coil compression return spring is rotationally isolated from the nut member.

2. The improved slack adjuster of claim 1, wherein said washer surrounds said rod.

* * * * *